Jan. 23, 1923.
J. BURKE.
ELECTRIC GENERATOR.
FILED NOV. 6, 1919.
1,442,854
2 SHEETS-SHEET 2
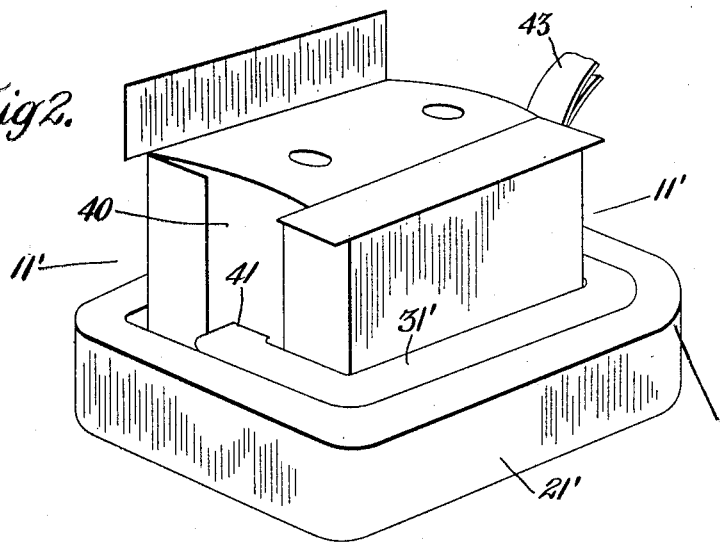
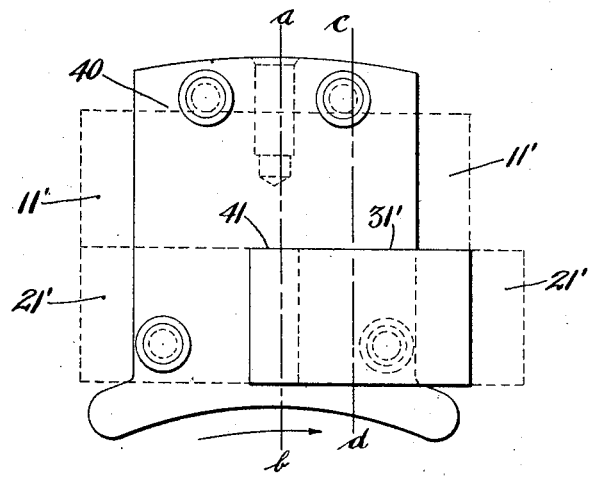
Inventor
James Burke
By Edwards, Sager & Bower
Attorneys Patented Jan. 23, 1923.

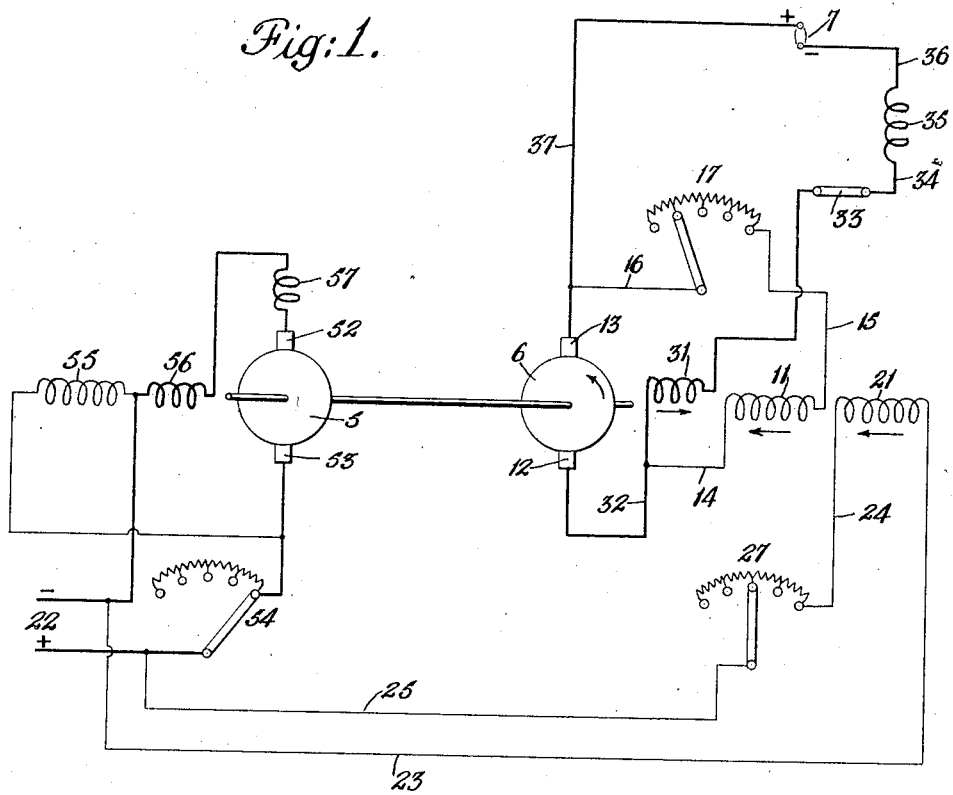

1,442,854

UNITED STATES PATENT OFFICE.

JAMES BURKE, OF ERIE, PENNSYLVANIA, ASSIGNOR TO BURKE ELECTRIC COMPANY, A CORPORATION OF PENNSYLVANIA.

ELECTRIC GENERATOR.

Application filed November 6, 1919. Serial No. 336,213.

*To all whom it may concern:*

Be it known that I, JAMES BURKE, a citizen of the United States, residing at Erie, in the county of Erie and State of Pennsylvania, have invented certain new and useful Improvements in Electric Generators, of which the following is a specification.

This invention relates to electrical apparatus for supplying continuous current and particularly relates to such apparatus for supplying current for welding or similar work. The chief object of the invention is to provide a source of current which will maintain a substantially constant flow under the widely variant load and voltage conditions during welding.

A further object of the invention is to provide apparatus that will be readily variable for different kinds of work, will be automatically self-regulating at any setting so that the operator is free to devote his entire attention to the work and is not bothered by troublesome adjustments or excessive or weak currents due to poor regulation.

In the accompanying drawings illustrating one embodiment of the invention in connection with electric welding, Fig. 1 is a diagrammatic showing of a motor-generator set and connections for supplying low voltage current for a welding arc.

Fig. 2 is a perspective view of one of the poles of the generator showing the positioning of the coils thereon, and Fig. 3 is an elevational view of the same.

In the specific embodiment of the invention illustrated in the drawings a motor 5, which may be either alternating or direct current, drives at constant speed a low voltage, direct current generator 6 supplying current to the welding arc 7. Practically the entire resistance in the welding circuit is concentrated at this arc and is highly variable even with the most skillful operator. In spite of the variable resistance of the welding arc it is important to maintain the current flow through the arc as nearly constant as possible so that the parts will be heated uniformly and the operator will have an arc of constant strength tending to avoid irregularities due to overheating at one point and underheating at another.

To provide this desired regulation and maintain a constant working strength of arc the generator 6 of this invention is provided with a number of variably excited field windings which will automatically maintain a substantially uniform welding current. In the apparatus shown excitation of the generator field is provided by winding 11 in shunt across generator brushes 12, 13 by connections 14, 15 and 16 and in series with the regulating rheostat 17 between connectors 15 and 16. Similarly directed excitation is provided by field winding 21 in shunt across the D. C. supply line 22 by connections 23, 24, 25 and 26 with regulating rheostat 27 in series between connections 24 and 25. When the armature circuit is closed and as the resistance decreases and the armature current increases the generator brush voltage will drop, reducing the current through winding 11 and weakening the generator field. Hence a decrease in the welding arc resistance will cause a lowering of the brush voltage and effect a regulation of the welding current toward uniformity. To further add to this regulation and stabilize the current output a third field winding 31 is provided magnetically opposite to windings 11 and 21 as indicated by the arrows near the windings in Fig. 1 and connected in series with the generator armature through brush 12, wire 32, line switch 33, wire 34, choke or inductance coil 35, wire 36, arc 7, wire 37 and brush 13. Line current in this series winding 31 opposes the excitation of fields 11 and 21 and reduces the generator field and voltage and thus further tends to reduce the rise in current which would be caused by a lowering of the arc resistance.

The coils of this series or differential winding 31 are not symmetrical with respect to the other coils and the pole pieces but are arranged eccentrically and shifted to one side in the direction of rotation of the armature. These coils are also wound so as not to encircle the whole of the corresponding pole piece but only one side. As shown in Figs. 2 and 3 each pole piece 40 is provided with a transverse passage 41 near the center of its armature end. Through this passage and around one side of the pole piece the coil 31' of the winding 31 is wound and provided with leads 43. Coil 21' of separately excited winding 21 encircles this differential coil and the pole piece and coil 11' of self-excited winding 11 surrounds the base of the pole piece at the side of the coils 21' and 31', all the generator poles being similarly wound. The winding 31 therefor only encircles a portion of the magnetic flux of windings 11 and 21 when this flux is evenly distributed in the poles and hence at small line currents a considerable part of the field flux does not link with the series winding. At higher currents however, the counter magneto-motive force of the armature distorts the lines of the field flux to shift the latter in the direction of rotation of the armature for instance from line *a—b* to line *c—d*, Fig. 3 and concentrate it at one side of the pole within the coils of the differential or series winding 31. Therefore the greater the line current the greater will be the relative differential effect of the winding 31.

Lowering of the arc resistance and increase of the line current will therefore weaken the generator field and lower the generator voltage by the counter-magneto motive force of the armature, the weakening of the self-excited winding 11, the differential effect of the bucking series coil 31, and the distortion of the flux at the poles concentrating the flux within said series differential coil. Conversely each increase in arc resistance and decrease in the line current will tend to strengthen the generator field and increase the generator voltage, and in the welding operation the current will be held substantially uniform at desired normal value for a particular type of welding by the combination and interaction of the field windings. At the same time this normal value may be widely varied and set to give different current strengths for different types of welding. Field winding 21 supplies the short circuit voltage and its rheostat 27 may be adjusted at short circuit to give a proper voltage for the current desired at short circuit. Field winding 11 supplies excitation at open circuit, weakening in effect with lowering of the brush voltage, and adjustment of its rheostat 17 serves to adjust the line amperage for a given setting of rheostat 27 so that the welding current is higher, lower or the same as the short circuited amperes. The effect of series field winding 31 is to weaken the generator field by the line currents and the number of turns in this winding is selected to properly co-act with the combined windings 11 and 21 and thus stabilize the ampere output.

In the welding set shown in diagram in Fig. 1 the driving motor 5 is of the D. C. constant speed type with brushes 52, 53 and starter 54 and having shunt field 55, series field 56 and interpoles 57. With such a D. C. driving circuit it is usual to place the separately excited winding 21 of the generator across the D. C. line as shown. When the line supply is alternating current a separate exciting generator is provided for this winding 21. While the invention is illustrated in connection with a specific embodiment its principle is not confined thereto but is intended to cover such modifications thereof as fall within the scope of the appended claims.

I claim:—

1. A constant current generator comprising an armature and a field therefor having a field winding in shunt across said armature, a similarly directed field winding excited from an external circuit, and a third field winding in series with said armature, said windings being located on the same field poles as each other and said third field winding being eccentrically arranged on the field poles with relation to the location of said first mentioned windings on the field poles.

2. A constant current generator comprising an armature and a field therefor having a field winding in shunt across said armature, a similarly directed field winding excited from an external circuit, and a third field winding in series with said armature, said windings being located on the same field poles as each other and said third field winding being eccentrically arranged on the field poles with relation to the location of said first mentioned windings on the field poles and being oppositely directed to said first mentioned windings.

3. A generator comprising an armature and a field frame, said field frame having inwardly projecting pole pieces, shunt windings on said pole pieces, separately excited windings on said pole pieces, and series windings on said pole pieces, said series windings surrounding only a part of said pole pieces respectively.

4. A generator comprising an armature and a field frame, said field frame having inwardly projecting pole pieces, shunt windings on said pole pieces, separately excited windings on said pole pieces, and series windings on said pole pieces, said series windings surrounding only a part of said pole pieces respectively and magnetically opposing said shunt and separately excited windings.

5. A generator comprising an armature and a field frame, said field frame having inwardly projecting pole pieces, shunt windings on said pole pieces, separately excited windings on said pole pieces, and series windings on said pole pieces, said series windings surrounding only a forward portion of said pole pieces respectively as regards direction of rotation of the armature and magnetically opposing said shunt and separately excited windings.

JAMES BURKE